United States Patent [19]
Bennett

[11] Patent Number: 5,825,708
[45] Date of Patent: Oct. 20, 1998

[54] CONTROL SYSTEM FOR ALLOWING MULTIPLE CHIPS OF A DISK DRIVE TO SAFELY ASSERT AND DE-ASSERT A RESET SIGNAL ON A RESET LINE

[75] Inventor: George Jeffrey Bennett, Murietta, Calif.

[73] Assignee: Western Digital Corporation, Irvine, Calif.

[21] Appl. No.: 972,405

[22] Filed: Nov. 18, 1997

[51] Int. Cl.⁶ .................................................. G11C 13/00
[52] U.S. Cl. .............................................. 365/226; 371/12
[58] Field of Search ...................... 365/226, 227, 365/53; 371/12

[56] References Cited

U.S. PATENT DOCUMENTS

| | | |
|---|---|---|
| 4,586,179 | 4/1986 | Sirazi et al. ............................... 371/12 |
| 4,894,565 | 1/1990 | Marquardt ................................ 307/518 |
| 5,144,159 | 9/1992 | Frisch et al. .......................... 307/272.3 |
| 5,153,455 | 10/1992 | Walters, Jr. ............................. 307/443 |
| 5,218,702 | 6/1993 | Kirtland ................................. 395/725 |
| 5,297,287 | 3/1994 | Miyayama et al. ..................... 395/700 |
| 5,315,184 | 5/1994 | Benhamida ............................. 307/518 |
| 5,398,265 | 3/1995 | Gabaldon et al. ....................... 395/275 |
| 5,519,346 | 5/1996 | Haddad et al. .......................... 327/143 |
| 5,528,749 | 6/1996 | Landis et al. ....................... 395/182.21 |

Primary Examiner—Terrell W. Fears
Attorney, Agent, or Firm—Leo J. Young; Milad G. Shara

[57] ABSTRACT

A disk drive includes a power driver chip, a microprocessor chip and a single reset line coupled to respective pins of the power driver and the microprocessor chip. The power driver chip includes a control circuit for inhibiting the power driver chip from de-asserting a reset signal on a reset line while the microprocessor chip is asserting the reset signal on the reset line.

25 Claims, 8 Drawing Sheets

CONTROL SYSTEM FOR ALLOWING MULTIPLE CHIPS OF A DISK DRIVE TO SAFELY ASSERT AND DE-ASSERT A RESET SIGNAL ON A RESET LINE

BACKGROUND OF THE INVENTION

1. Field of the Invention

The invention relates generally to disk drives. More specifically, the invention relates to a control system for allowing multiple chips of a disk drive to assert and de-assert a reset signal over a reset line.

2. Description of the Prior Art

A disk drive includes multiple platters for storing encoded data and a head stack for performing read and write operations on the platters. Transducers of the head stack are positioned over specific tracks of the platters, and the read and write operations are performed.

The disk drive also includes a number of semiconductor chips for controlling the read and write operations. The chips include a disk controller chip, a microprocessor chip and a power driver chip. At startup of the disk drive, operation of these chips is synchronized to start at the same time.

A reset signal is used for synchronizing the start times of the chips. The reset signal is typically supplied to each of the chips over a single reset line. At startup, the reset signal is asserted until all of the chips are ready to begin operation. Then the reset signal is de-asserted, whereupon the chips begin performing their startup procedures.

The reset signal also alerts the chips of fault conditions such as undervoltage conditions, illegal operations, etc. For example, the power driver chip might detect an undervoltage conditions, or the microprocessor chip might attempt to execute an invalid op code. Each chip includes drivers for asserting and de-asserting the reset signal. When one of the chips detects a fault condition, it asserts the reset signal on the reset line. In response, all of the chips either stop their normal operations or perform shutdown routines. When the fault condition has disappeared, the reset signal is de-asserted and the chips reset to known states and restart their operations.

A problem can occur when the power driver chip is de-asserting a reset signal while another chip is asserting the reset signal. This problem can occur at power up because the voltage applied to the chips has a rise time and because the chips usually become operational at different thresholds and detect undervoltage conditions at different thresholds. FIG. 1 illustrates a problem in which the power driver chip has a lower undervoltage threshold than the microprocessor chip. When power is initially supplied to the disk drive, the voltage begins to rise. The power driver chip becomes operational first and asserts a reset signal (since the voltage has not yet risen to the undervoltage threshold). Soon after, the microprocessor chip becomes operational and asserts its reset signal. The voltage continues to rise until the undervoltage threshold of the power driver chip is reached. No longer detecting an undervoltage condition, the power driver chip de-asserts the reset signal. With the power driver chip de-asserting the reset signal at a high voltage level and the microprocessor chip still asserting the reset signal at a low level, a high current flows through the reset line. The high current destroys the drivers of both the power driver chip and the microprocessor chip. Consequently, the disk drive would have to be replaced.

Another problem can occur if the power driver chip asserts the reset signal while the microprocessor chip is asserting the reset signal. Typically the power driver chip will stretch the signal on the reset line in order to allow other circuits of the disk drive to stabilize. That is, after the voltage rises above the undervoltage threshold, the power driver chip delays for a period of time before de-asserting the reset signal and allowing the other chips to begin operation. In the meantime, the microprocessor chip receives the reset signal and, due to internal delays, echoes the reset signal back to the power driver chip. The echoed reset signal, in turn, restarts the delay period of the power driver chip. Resulting is a "deadly embrace", in which the power driver chip continually stretches the reset signal and possibly never de-asserts the reset signal.

A seemingly simple solution to these problems would be for the power driver chip to use two separate pins: one pin for sending the reset signal and the other pin for receiving the reset signal. However, the microprocessor chip is not a custom-made chip and does not accommodate a second pin for a reset signal. Moreover, the addition of a second pin would increase the pin count of the power driver chip, a luxury that the disk drive manufacturer might not be able to afford. Increasing the pin count by one pin can add approximately twenty five cents to the cost of manufacturing the disk drive. For a disk drive manufacturer who sells tens of millions of disk drivers per year, adding the extra pin can reduce its profits by millions of dollars.

Needed is a simple solution that allows a power driver chip to send and receive the reset signals on a single reset line while preventing the drivers from being damaged and preventing deadly embraces from occurring.

SUMMARY OF THE INVENTION

The invention can be regarded as a power driver chip. In a disk drive including a reset line, an integrated circuit having a first reset pin coupled to the reset line and first means coupled to the first reset pin for switchably asserting a reset signal to a first level on the reset line, the power driver chip comprises a second pin adapted to be coupled to the reset line; second means coupled to the second reset pin for switchably asserting the reset signal to a second level on the reset line; third means coupled to the second reset pin for switchably de-asserting the reset signal to a third level on the reset line; and control means coupled between the reset line and the third means. The control means includes means for producing a level discrimination signal representing whether the first means is asserting the reset signal; and arbitration means responsive to the level discrimination signal for inhibiting the third means from de-asserting the reset signal while the first means is asserting the reset signal. Thus, the control means prevents the power driver chip from de-asserting the reset signal while the integrated circuit is asserting the reset signal.

In a disk drive including a reset line, an integrated circuit having a first reset pin coupled to the reset line and first means coupled to the first reset pin for switchably providing a low impedance source to assert a reset signal on the reset line, the power driver chip comprises a second pin adapted to be coupled to the reset line; second means coupled to the second reset pin for switchably providing a low impedance source to assert the reset signal on the reset line; third means coupled to the second reset pin for switchably providing a low impedance source to deassert the reset signal on the reset line; and control means coupled between the reset line and the third means. The control means includes means for producing a level discrimination signal representing whether the first means is asserting the reset signal; and arbitration means responsive to the level discrimination signal for inhibiting the third means from de-asserting the reset signal while the first means is asserting the reset signal.

The invention can also be regarded as a disk drive comprising a head disk assembly and a printed circuit board assembly. The printed circuit board assembly includes a reset line; an integrated circuit; and a microprocessor chip including a first pin connected to the reset line and a first driver coupled to the first pin. The first driver is commanded to assert a reset signal to a first level on the reset line. The integrated circuit includes a second pin connected to the reset line; a second driver coupled to the second pin, the second driver being commanded to assert the reset signal to a second level on the reset line; and a third driver coupled to the second pin, the third driver being commanded to de-assert the reset signal to a third level on the reset line. The first and third levels have a potential difference sufficient to cause damage to the disk drive. The printed circuit assembly board further includes first detection means, coupled to the second pin, for detecting the first level on the reset line; second detection means for detecting a reset condition of the integrated circuit; and arbitration means for commanding the second driver to assert the reset signal to the second level when the second detection means detects the first level on the reset line. The arbitration means inhibits the third driver from de-asserting the reset signal when the first detection means detects the first level on the reset line.

The invention can also be regarded as a method of asserting a reset signal on a reset line when a reset condition is detected external of an integrated circuit chip including a pin coupled to the reset line. The integrated circuit chip also includes a circuit coupled to the reset pin for switchably asserting a reset signal to a first level on the reset pin. The method comprises the steps of asserting the reset signal to a second level on the reset line when a reset condition is detected external of the integrated circuit chip; detecting when the circuit is asserting the reset signal at the first level on the reset line; and inhibiting the reset signal from being de-asserted to a third level on the reset line while the reset signal is being asserted to the first level on the reset line.

DESCRIPTION OF THE PREFERRED EMBODIMENTS

Figure 2:
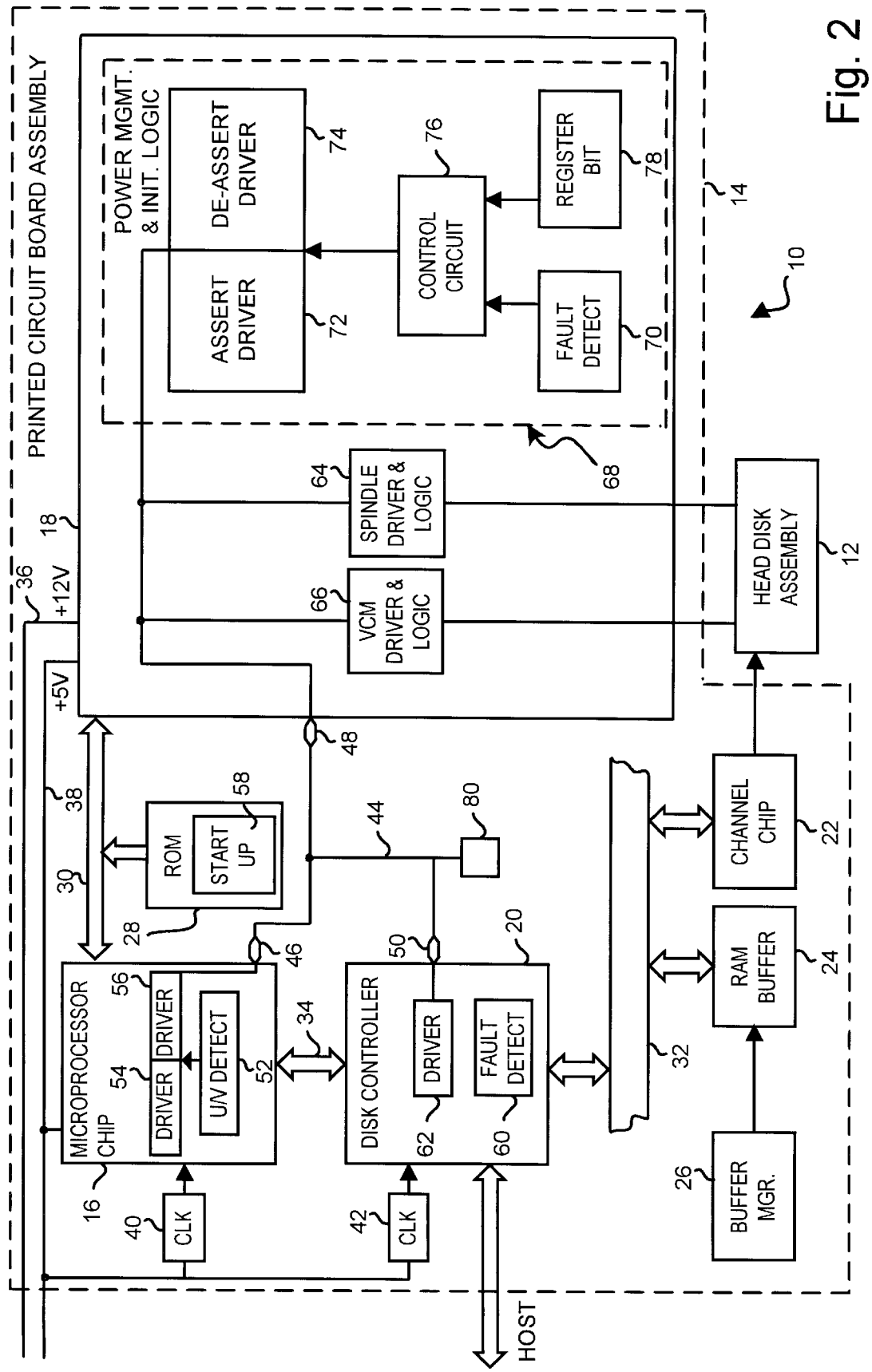
FIG. 2 is a block diagram of a disk drive according to the present invention.

With reference to FIG. 2, a disk drive generally indicated at 10 includes a head disk assembly 12 and a printed circuit board assembly 14. The head disk assembly 12 includes a plurality of platters for storing encoded data and a spindle motor for spinning the platters. The head disk assembly 12 also includes a voice coil motor and a head stack including read/write transducers. During read and write operations, the platters are spun at a relatively constant speed and the transducers are positioned over specific tracks of the platters.

The printed circuit board assembly 14 includes a microprocessor chip 16, a power driver chip 18, a disk controller chip 20, a channel chip 22, a RAM buffer 24 and a buffer manager 26. When a write operation is performed, data is received from a host (e.g., a computer motherboard) and buffered in the RAM buffer 24 under control of the buffer manager 26. The disk controller chip 20 performs error code correction ("ECC") encoding such as Reed-Solomon encoding on the buffered data. The encoded data is sent to a write channel of the channel chip 22. The write channel, in turn, performs additional encoding and digital-to-analog conversion. An output of the write channel is supplied to the transducers for writing to the platters.

When a read operation is performed, encoded data and servo data on the platters 16 are read by the transducers and sent to a read channel of the channel chip 22 The read channel separates the encoded data from the servo data, and performs analog-to-digital conversion and decoding on the encoded data. An output of the read channel is buffered in the RAM buffer 24. The disk controller chip 20 also performs error code correction on the buffered data before sending the data to the host.

Among its various functions, the microprocessor chip 16 controls the sequencing of the read and write operations. The microprocessor chip 16 also controls the speed of the spindle motor and the transducer positioning by voice coil motor. A ROM 28 is programmed with instructions for instructing the microprocessor chip 16 to perform its various functions.

The chips 16 to 22 communicate over various communication buses. For example, the microprocessor chip 16 could communicate with the power driver chip 18 over a serial bus 30, the disk controller chip 20 could communicate directly with the channel chip 22 and the RAM buffer 24 over an NRZD bus 32, and the microprocessor chip 16 could communicate with the disk controller chip 20 over a microprocessor bus 34.

Figure 1:
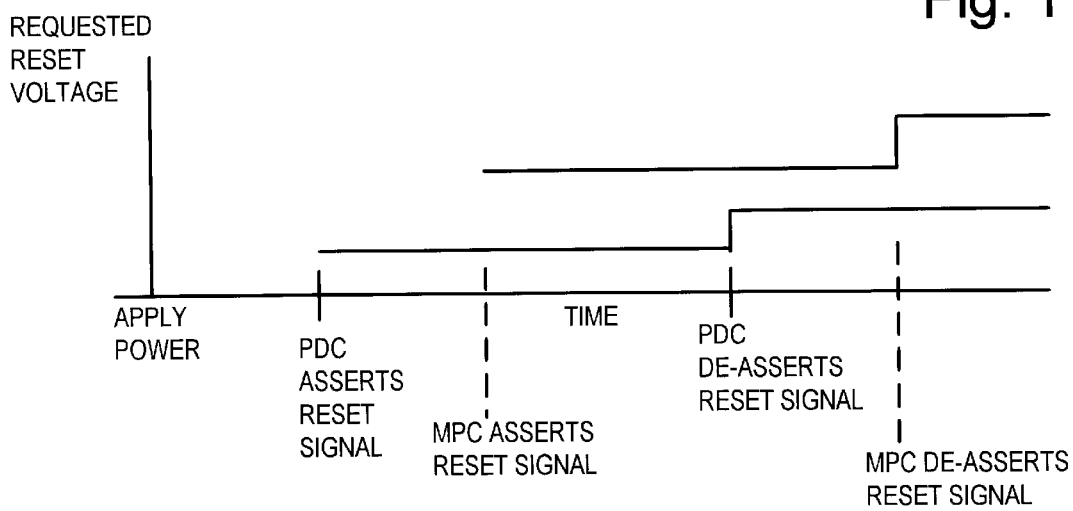
FIG. 1 is a timeline of a reset signal asserted and de-asserted by a microprocessor chip and a power driver chip during power up of a disk drive according to the prior art.
Figure 3:
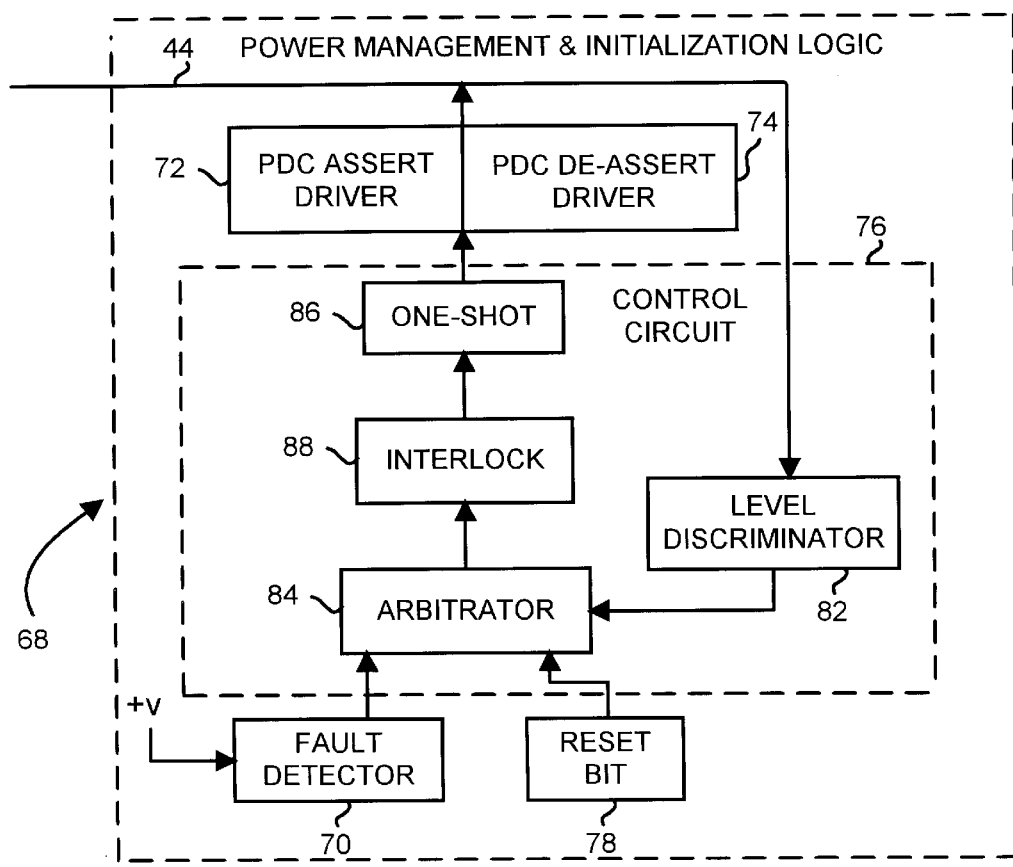
FIG. 3 is a block diagram of power management and initialization logic for a power driver chip, which forms a part of the disk drive shown in FIG. 3.

The printed circuit board assembly 14 further includes at least one power bus for supplying power to the chips. FIG. 3 happens to show two power buses: a first power bus 36 for the power driver (analog) chip 18 and a second power bus 38 for the other (digital) chips. The second power bus 38 also supplies power to clocks 40 and 42 for the microprocessor chip 16 and the disk controller chip 20. Power is supplied to the power buses 36 and 38 by the host. When the power is supplied to the power buses 36 and 38, the power is not received by the chips 16, 18 and 20 instantaneously. Instead, voltages on the power buses 36 and 38 exhibit rise times. Moreover, the voltages on the first and second buses 36 and 38 do not necessarily rise together. The voltage on the first bus 36, for example, might rise faster than the voltage on the second bus 38.

Due to manufacturing tolerances, the microprocessor chip 16, the power driver chip 18 and the disk controller chip 20 might become operational at different voltage levels. Additionally, microprocessor chip 16, the power driver chip 18 and the disk controller chip 20 might have different undervoltage thresholds. Thus, as the voltages rise on the power buses 36 and 38, the microprocessor chip 16, the power driver chip 18 and the disk controller chip 20 might become operational at different times, and their voltages might rise above their undervoltage thresholds at different times.

The printed circuit board assembly 14 further includes a reset line 44 wired to a single pin 46 of the microprocessor chip 16, a single pin 48 of the power driver chip 18 and a single pin 50 of the disk controller chip 20. When a reset signal is asserted on the reset line 44, the microprocessor chip 16, the power driver chip 18 and the disk controller chip 20 all respond, either by halting operation or by performing reset procedures. When the reset signal is deasserted, the microprocessor chip 16, the power driver chip 18 and the disk controller chip 20 all respond by resetting to known states and performing startup procedures.

The microprocessor chip 16 includes an undervoltage detector 52 and a low impedance driver 54 for asserting a reset signal at a first level on the reset line 44 when an undervoltage condition or another fault condition (e.g., execution of an invalid op code) is detected. Typically, the impedance of the microprocessor chip ("MPC") assert driver 54 is less than fifty ohms. While the impedance is low, the MPC assert driver 54 cannot sink a lot of current and, therefore, can be damaged by higher currents. An Intel 196 NU microprocessor chip, for example, can only sink about five milliamps of current.

The microprocessor chip 16 also includes a driver 56 for de-asserting the reset signal on the reset line 44. However, the microprocessor chip ("MPC") de-assert driver has a weak pullup that is uncontrolled by the manufacturer of the microprocessor chip 16. Resulting is a long reset rise time.

When the reset signal is asserted on the reset line 44, the microprocessor chip 16 resets to a known state and begins executing a startup routine 58 which includes chip initialization. The startup routine is stored in the ROM 28. When the reset signal is de-asserted, the microprocessor chip 16 stops performing its normal operations.

The disk controller chip 20 includes a fault detector 60 for detecting on-chip fault conditions such as an undervoltage condition. The disk controller chip 20 further includes a disk controller chip ("DCC") driver 62 for asserting the reset signal at the first level when the fault detector 60 detects a fault condition. The reset signal causes the disk controller chip 20 to initialize (e.g., reset registers) to a known state.

The power driver chip 18 includes drivers and logic 64 for driving the spindle motor, and drivers and logic 66 for driving the voice coil motor. When the reset signal is asserted, the spindle motor logic 64 and the voice coil motor logic 66 also perform reset procedures including parking the head stack and braking the spindle motor.

The power driver chip 18 also includes power management and initialization logic 68. The power management and initialization logic 68 includes a fault detector 70 for performing on-chip fault detection such as undervoltage detection; a low impedance power driver chip ("PDC") driver 72 coupled to the reset line 44 for asserting the reset signal; and a low impedance PDC driver 74 coupled to the reset line 44, for de-asserting the reset signal. The impedances for the PDC assert and de-assert drivers 72 and 74 are approximately the same as the impedance of the MPC assert driver 54. The use of low impedance drivers 72 and 74 on the power driver chip 18 allows for synchronous resets.

Moreover, the PDC de-assert driver 74 has a faster pullup than the MPC de-assert driver 56, As a result, the PDC de-assert driver 74 has exclusive control over de-assertion of the reset signal on the reset line 44. Consequently, de-assertion is performed quickly; the reset signal has a fast rise time in order to allow the startup procedures of the various chips to begin at the same time.

The PDC assert driver 72 asserts the reset signal at a second level, which is different than the first level asserted by the microprocessor chip 16 and the disk controller chip 20. However, the microprocessor chip 16 and the disk controller chip 20 do not distinguish between the different low levels. Both levels simply appear as resets to the microprocessor and disk controller chips 16 and 20.

The PDC de-assert driver 74 de-asserts the reset signal to a third level. For example, deassertion of the reset signal might correspond to a voltage of 3.6 volts. Assertion of the reset signal at the first level might correspond to a voltage of 0.2 volts, and assertion of the reset signal at the second level might correspond to a voltage of 0.5 volts.

The power management and initialization logic 68 further includes a control circuit 76 coupled to the reset line 44 for detecting when the reset signal is being asserted at the first level. The control circuit 76 also inhibits the PDC de-assert driver 74 from de-asserting the reset signal while the reset signal is being asserted by either the microprocessor chip 16 or the disk controller chip 20. Thus, the control circuit 76 prevents the power driver chip 18 from de-asserting the reset signal while the microprocessor chip 16 or the disk controller chip 20 is asserting the reset signal. Because the power driver chip 18 is prevented from de-asserting the reset signal while either the microprocessor chip 16 or the disk controller chip 20 are asserting the reset signal, the drivers 54, 56, 62, 72 ad 74 are prevented from being destroyed.

A reset condition can be initiated by setting a reset bit 78 on the power driver chip 16. When the reset bit 78 is set, the control circuit 76 causes the PDC assert driver 72 to assert the reset signal. The reset bit 78 can be set by the microprocessor chip 16. Thus, the microprocessor chip 16 can cause a reset of the disk drive 10 either by asserting the reset signal or setting the reset bit 78.

The printed circuit board assembly further includes a test point 80 for allowing an external device such as a relay or tester to be connected to the reset line 44. The test point 80 allows the external device to assert the reset signal on the reset line 44 in order to restart the disk drive 10.

In the paragraphs that follow, the term "external logic low" will refer to the assertion of the reset signal at the first level (that is, assertion of the reset signal by either the microprocessor chip 16 or the disk controller chip 20), the term "internal logic low" will refer to the assertion of the reset signal at the second level (that is, assertion of the reset signal by the power driver chip 18), and the term "logic high" will refer to de-assertion of the reset signal. The internal logic low is higher (e.g., has a higher voltage or a higher current) than the external logic low. These terms are used merely to facilitate an understanding of the invention. It is understood that assertion of the reset signal is not limited to low levels, and that de-assertion of the reset signal is not high levels.

FIG. 3 shows the power management and initialization logic 68 in greater detail. The control circuit 76 includes a level discriminator 82 that generates a level discrimination signal indicating whether the microprocessor chip 16 or the disk controller chip 20 are asserting the reset signal. For example, the level discriminator 82 could include a comparator for comparing the voltage on the reset line to a predetermined level. Assertion of the reset signal to the external logic low would pull the voltage on the reset line below the predetermined level and cause the comparator to generate the level discrimination signal. In the alternative, the discrimination detector 82 could detect whether current on the reset line 44 is flowing into or out of the power driver chip 18. Assertion of the reset signal could cause current to flow out of the power driver chip 18 and the level discrimination signal to be generated.

The control circuit 76 further includes an arbitrator 84. When the fault detector 70 detects an on-chip fault, the arbitrator 84 resets a one-shot 86, which commands the PDC assert driver 72 to pull the reset line 44 to the internal logic low. When the level discriminator 82 detects that the reset line has been pulled to the external logic low, the arbitrator 84 commands the PDC assert driver 72 to pull the reset line to the internal logic low (if the voltage level of the external logic low is below that of the internal logic low, the reset line will remain at the external logic low and current on the reset line 44 will flow out of the power driver chip 18). While the reset line is being held at the internal logic low or external logic low, the PDC de-assert driver 74 is turned off and is inhibited from pulling the reset line 44 to the logic high.

Once the level discriminator 82 detects that reset line 44 has been released by the microprocessor chip 16 and the disk controller chip 20 (that is, the reset line goes to the internal logic low), and that on-chip faults have been cleared, the arbitrator 84 starts the one-shot 86. The one-shot 86 waits for a delay period and then sends a signal to the PDC de-assert driver 74, which turns off the PDC assert driver 72 and causes the PDC de-assert driver 74 to pull the reset line 44 to the logic high. The reset signal having been de-asserted, the chips 16, 18 and 20 begin their startup procedures.

The delay period, which could be as short as a few nanoseconds, allows for timing variations to settle between the drivers 52, 54, 62, 72 and 74 (different drivers might have different sizes and different speeds). The delay period would also allow sufficient time for the voltages on the power buses 36 and 38 to rise above the undervoltage thresholds of the chips 16, 18 and 20. The delay period could even allow sufficient time for the clocks 40 and 42 to settle after power is initially applied to the disk drive 10.

An interlock 88 includes logic for preventing transients from producing ambiguous states that might turn on both PDC drivers 72 and 74. Thus, the interlock 88 ensures a reliable transition from the internal logic low to the logic high.

Figure 4:
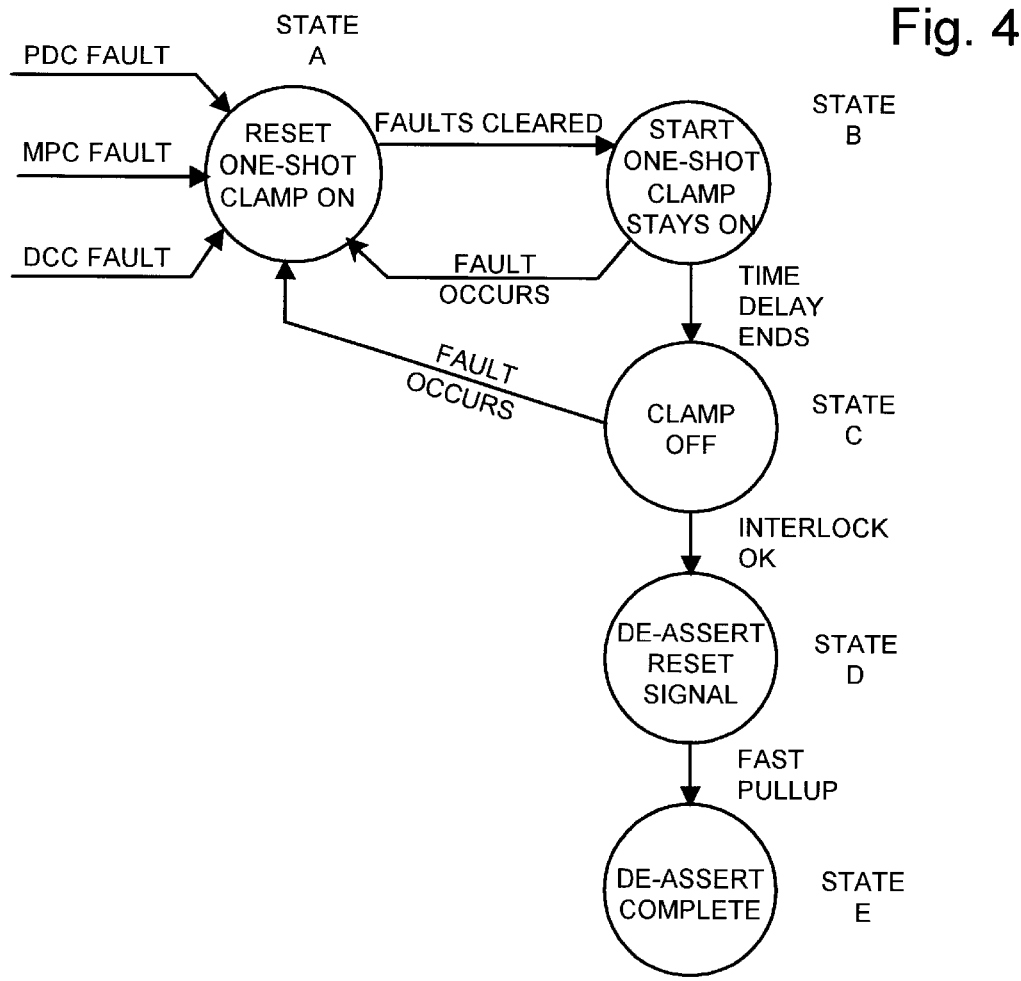
FIG. 4 is a state diagram for a control circuit, which forms a part of the power management and initialization logic shown in FIG. 4.

FIG. 4 shows a state diagram for the control circuit 76. At state A, a fault detected by the fault detector 70 causes the arbitrator 84 to reset the one-shot 86, whereby the PDC assert driver 72 clamps the reset line 44 to the internal logic low. A fault detected by the microprocessor chip 16 or the disk controller chip 20 causes the reset line 44 to be pulled to an external logic low and the arbitrator 84 to reset the one-shot 86, whereby the PDC assert driver 72 clamps the reset line 44 to the internal logic low. The PDC de-assert driver 74 is inhibited from pulling the reset line 44 to the logic high.

After the faults have been cleared, the arbitrator 84 transitions to state B. The arbitrator 84 starts the one-shot 86, whereby the delay period begins. The PDC assert driver 72 is still clamping the reset line 44 to the internal logic low, and the PDC de-assert driver 74 is still inhibited from de-asserting the reset signal.

When the delay period ends, the arbitrator 84 transitions to state C. The clamp is turned off. If a fault is detected during the delay period, the one-shot 86 is reset and the arbitrator 84 transitions to state A. If the interlock 88 is okay after the delay period ends, the arbitrator 84 transitions to state D. The PDC de-assert driver 74 is turned on and begins pulling the reset line 44 to the logic high. A fast pullup occurs and de-assertion is competed (state E). The chips 16 to 20 begin their startup procedures.

Figure 5:
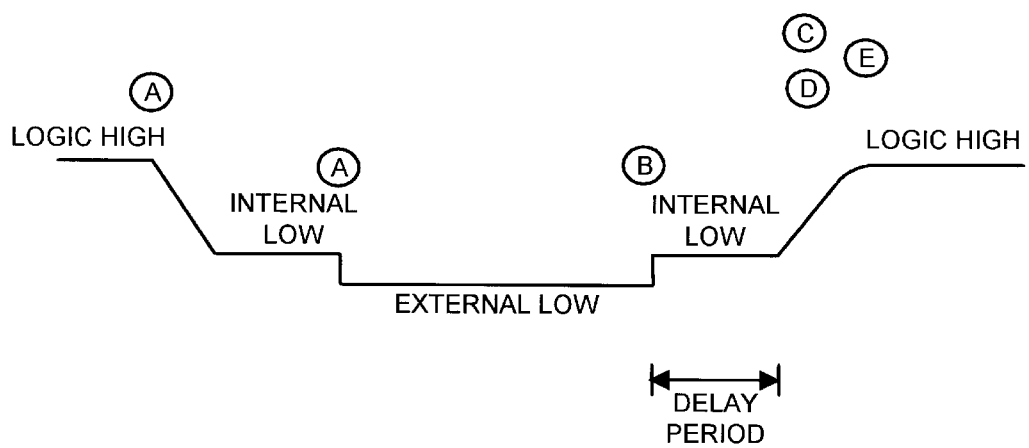
FIG. 5 is a timing diagram of a reset signal during a reset condition of the disk drive shown in FIG. 3.

FIG. 5 provides an example of a reset signal that is de-asserted, asserted and once again de-asserted. Initially, the PDC de-assert driver 74 holds the reset line 44 at the logic high. Then the fault detector 70 of the power driver chip 18 detects a fault, whereby the PDC de-assert driver 74 is turned off and the PDC assert driver 72 is turned on. The PDC assert driver 72 pulls the reset line 44 to the internal logic low. Next, the microprocessor chip 16 asserts the reset signal, whereby the reset line 44 is pulled to the external logic low. After all fault conditions disappear, the microprocessor chip 16 releases the reset line 44. Because the PDC assert driver 72 is still turned on, the reset line 44 is clamped to the internal logic low. Additionally, one-shot 86 is started. After the delay period expires, the PDC assert driver 72 is turned off and the PDC de-assert 74 driver is turned on, whereby the reset line 44 is quickly pulled up to the logic high.

Figure 6:
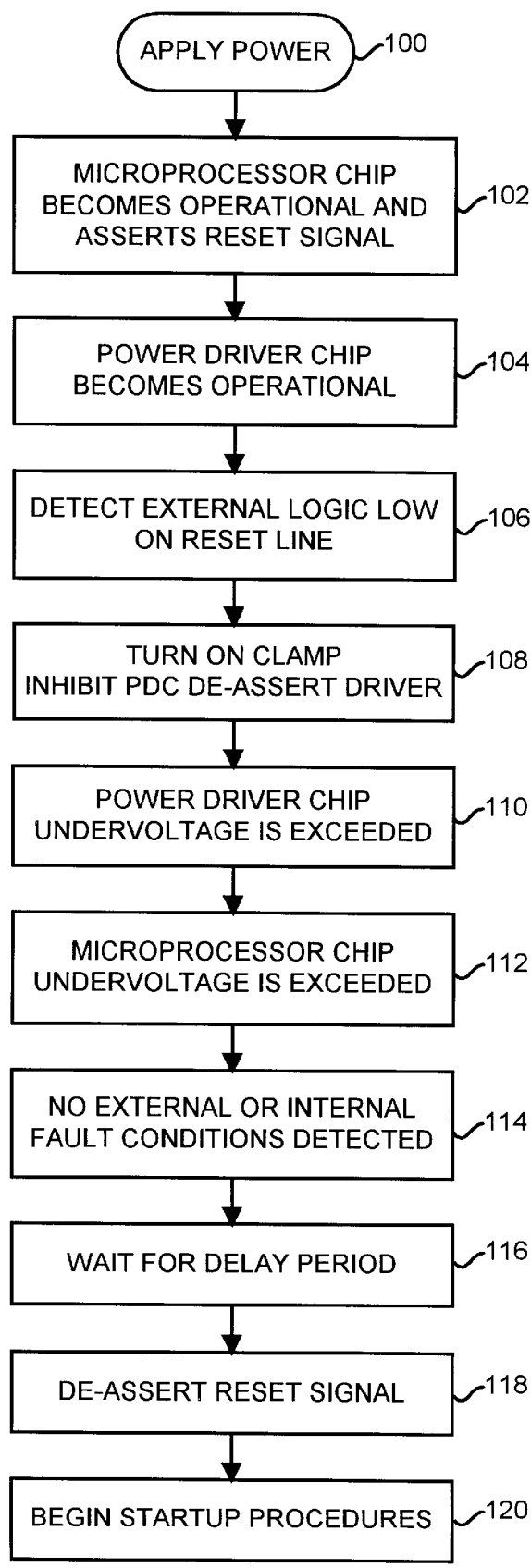
FIGS. 6 to 8 are flowcharts of different scenarios during which the reset signal is asserted and de-asserted on a reset line.
Figure 7:
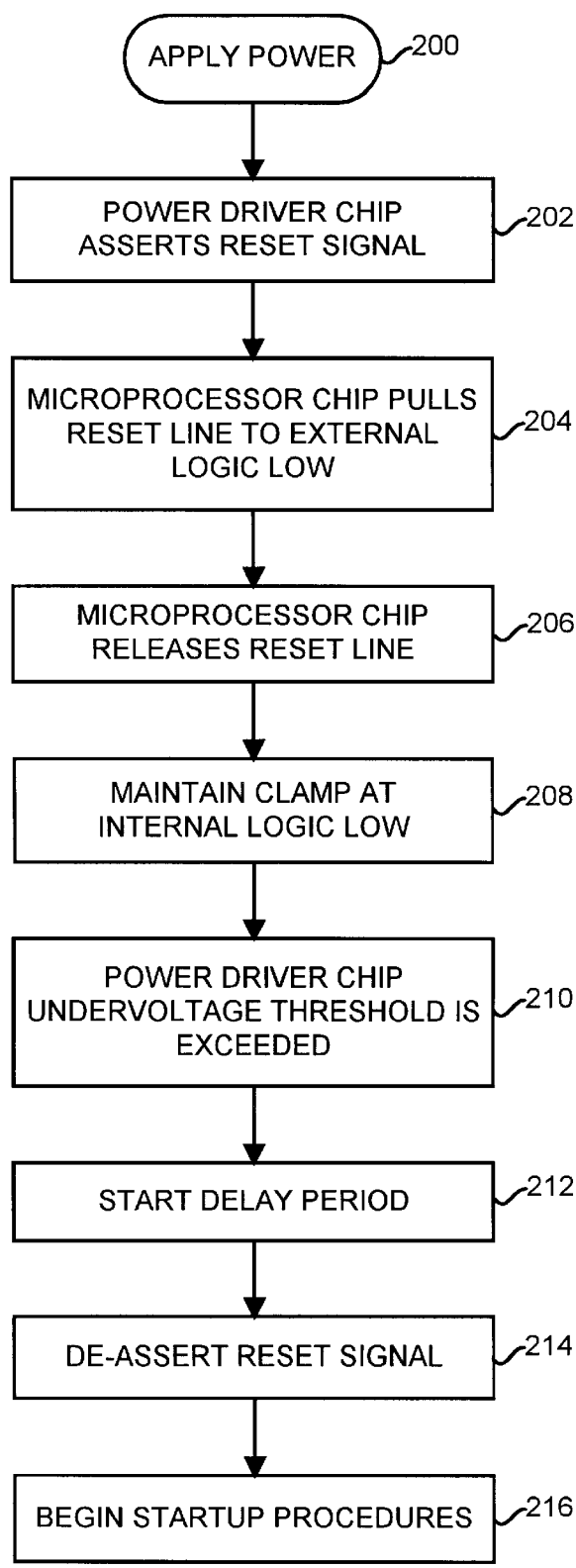
Figure 8:
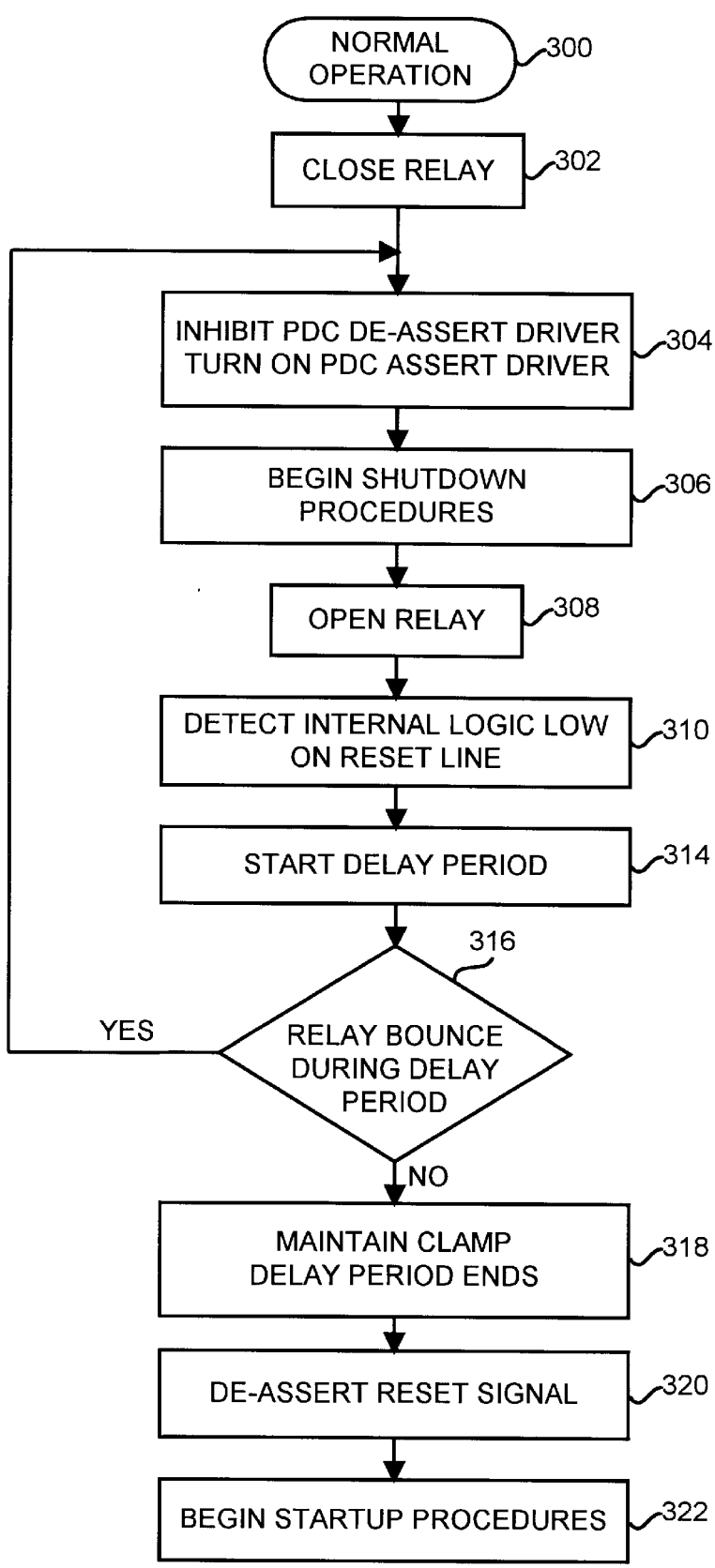

FIGS. 6 to 8 show several operating scenarios for the control circuit 76. The scenario of FIG. 6 occurs during startup when the voltage for the power driver chip 18 rises above the PDC undervoltage threshold before the voltage for the microprocessor chip 16 rises above the MPC undervoltage threshold. After power is applied to the disk drive 10 (step 100), the voltages begin to rise on the power buses 36 and 38. The microprocessor chip 16 becomes operational and, detecting an undervoltage condition, pulls the reset line 44 to the external logic low (step 102). The power driver chip 18 then becomes operational and the fault detector 70 detects an undervoltage condition (step 104). Additionally, the level discriminator 82 detects an external logic low on the reset line (step 106). The arbitrator 84 resets the one-shot 86, which turns on the PDC assert driver 72 and turns off the PDC de-assert driver (step 108). As the voltages continue to rise, the undervoltage threshold for the power driver chip 18 is exceeded (step 110). Because the level discriminator 82 still detects the external logic low on the reset line 44, the PDC assert driver 72 is kept on and the PDC de-assert driver 74 is kept off. Then the undervoltage threshold for the microprocessor chip 16 is exceeded (step 112), whereupon the microprocessor chip 16 releases the reset line 44. Thus, the voltage level on the reset line goes to the internal logic low. The level discriminator 82 does not detect any external resets, and the fault detector 70 does not detect any faults on the power driver chip 18 (step 114), so the arbitrator 84 starts the one shot 86 and the delay period begins. During the delay period, the reset line 44 is still clamped to the internal logic low; therefore, the microprocessor chip 16 and the disk controller chip 20 have not yet started their startup procedures.

At the end of the delay period (step 116), the PDC assert driver 72 is turned off and the PDC de-assert driver 74 is turned on, whereby the reset signal is de-asserted (step 118). Once the reset signal is de-asserted, the microprocessor chip 16, power driver chip 18 and disk controller chip 20 begin their startup procedures (step 120).

The scenario of FIG. 7 occurs during startup when the voltage for the microprocessor chip 16 rises above the MPC undervoltage threshold before the voltage for the power driver chip 18 rises above the PDC undervoltage threshold. After power is applied to the disk drive 10 (step 200), the power driver chip 18 becomes operational and pulls the reset line 44 to an internal logic low (step 202). Then the microprocessor chip 16 becomes operational and pulls the reset line 44 to the external logic low (step 204). The microprocessor chip 16 then releases the reset line (step 206). Still, the fault detector 70 detects an undervoltage condition on the power driver chip 16, so the arbitrator 84 does not start the one-shot 86. The PDC assert driver 72 remains on, the PDC de-assert driver remains off, and the reset line 44 remains at the internal logic low (step 208). After the PDC undervoltage threshold has been exceeded (step 21 0), the arbitrator 84 starts the one-shot 86, whereby the delay period begins. (step 212). After the delay period has expired, the PDC assert driver 72 is turned off and the PDC de-assert driver 74 is turned on (step 214), whereupon the chips 16, 18 and 20 begin their startup procedures (step 216).

The scenario of FIG. 8 is precipitated by a reset condition occurring during normal operation of the disk drive 10 (step 300). A reset condition could be initiated because the microprocessor chip 16 detects an invalid operation. In this scenario, however, the reset condition is initiated by a relay connected to the test point 80 (step 302). The reset line is pulled to the external logic low, whereupon the arbitrator 84 turns off the PDC de-assert driver 74 and turns on the PDC assert driver 72 (step 304). In the meantime, the chips 16, 18 and 20 begin their shutdown procedures (step 306). Thus, the power driver chip 18 parks the head stack and begins braking the spindle motor.

Once the relay is opened (step 308), the level discriminator 82 detects that the reset line is above the external logic low (step 310) and the arbitration circuit starts the delay period (step 312). The PDC assert driver 72 remains on, and the PDC de-assert driver 74 remains off.

During the delay period (step 314), the relay bounces a few times (step 316). Each bounce pulls the reset line to the external logic low and causes a return to step 304. Because the bounces occur during the delay period, the chips 16, 18 and 20 continue with their shutdown procedures, uninterrupted.

After the relay has stopped bouncing (step 3 16), the delay period continues, the PDC assert driver 72 remains on, and the PDC de-assert driver 74 remains off (step 318). After the delay period has ended, the PDC de-assert driver 74 pull the reset line 44 to the logic high (step 320), whereupon the chips 16, 18 and 20 begin their startup procedures (step 322).

Figure 9:
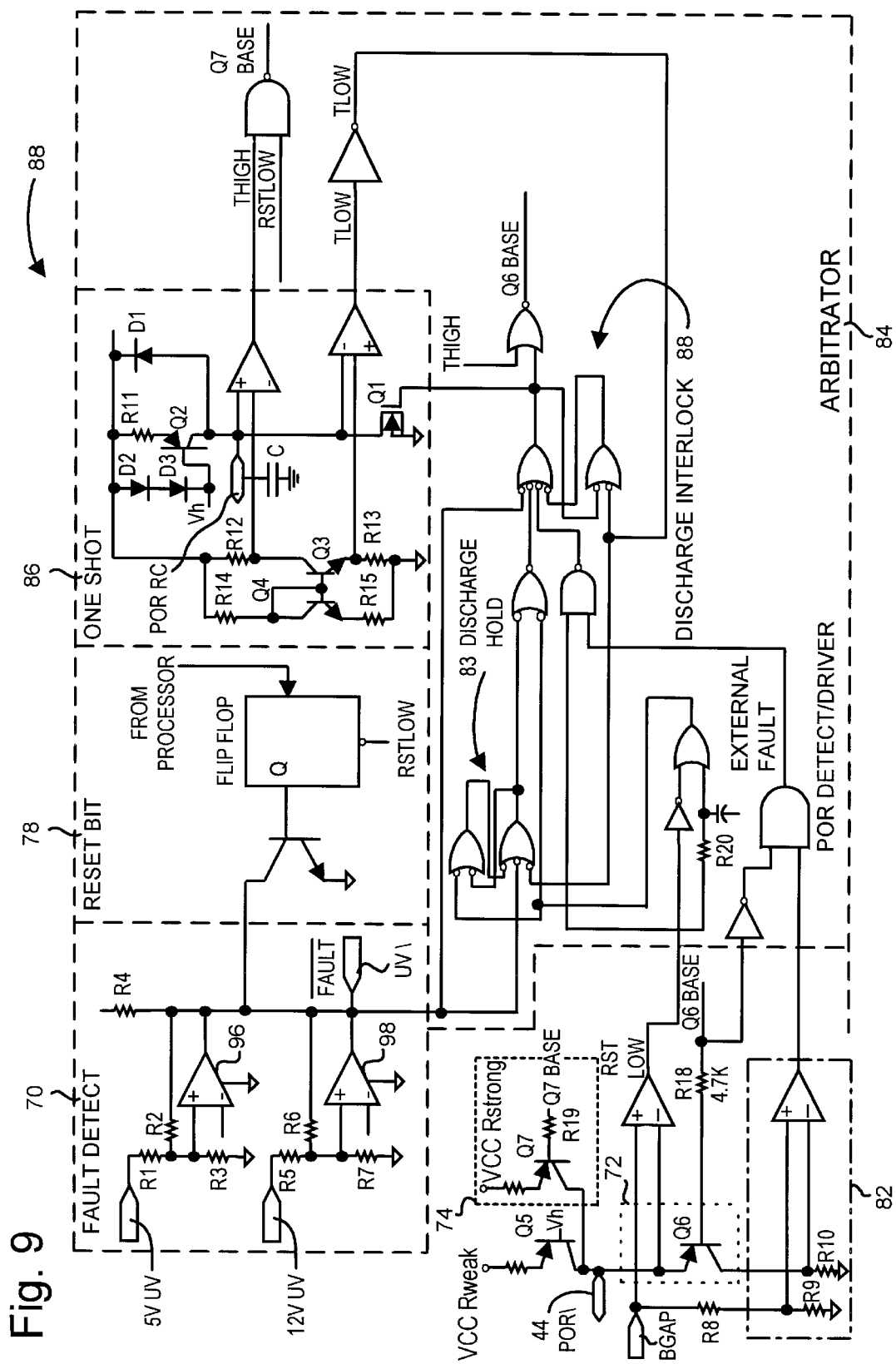
FIG. 9 is an embodiment of the power management and initialization logic of FIG. 3.

FIG. 9 shows an embodiment of the power management and initialization logic 68. The fault detector 70 includes a pull-up resistor R4 and open collectors inside the comparators 96, 98. The open collectors are tied to the pull-up resistor R4. Resulting is a wired-OR, whereby either a 5 v undervoltage condition or a 12 volt undervoltage condition will generate a fault. Resistors R2 and R6 add hysteresis to reduce triggering due to noise.

The reset bit 78 includes a flip flop that is set by the microprocessor chip. When the reset bit is set, the reset line 44 is pulled low through the transistor. A reset low allows the flip-flop to be reset once the one-shot 86 has started.

The one-shot 86 includes an external capacitor C that determines the delay period. Transistor Q2 is a current source that charges the capacitor C and keeps the timing constant even if the voltage varies. Transistor Q1 discharges when it is time to reset the one-shot.

The discharge hold 83 has a first input that fully discharges the one-shot 86 so that timing is proper. A second input starts the one-shot 86.

The discharge interlock 88 prevents race conditions from occurring. The level discriminator 82 detects the direction of current flowing on the reset line 44. Current in transistor Q5 either flows out of the power driver chip 18 onto the reset line, or it flows through resistor R10.

Figure 10:
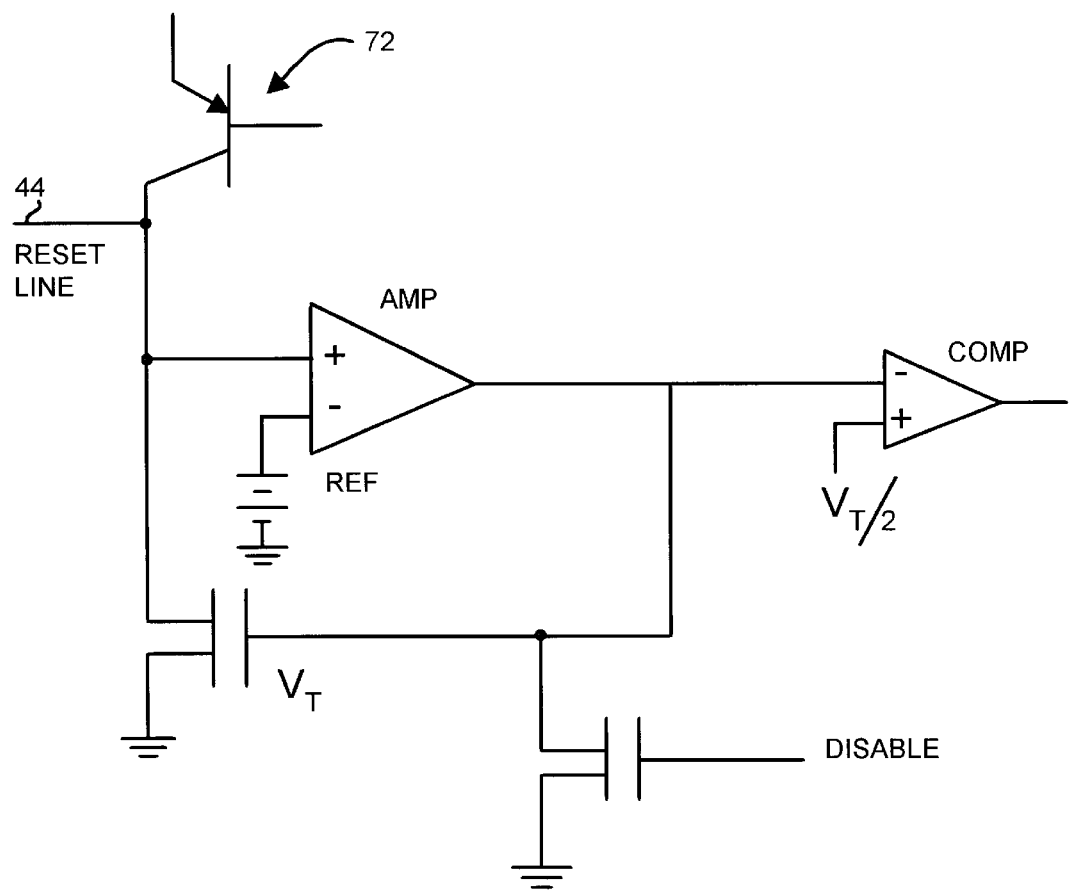
FIG. 10 is an alternative embodiment of a current discriminator for the control circuit of FIG. 3.

FIG. 10 shows an embodiment of a level discriminator 82' that detects reset signal assertion by looking at the voltage level on the reset line 44. An amplifier AMP looks for the voltage levels on the reset line 44. If the external logic low is detected, an output of the amplifier AMP goes low. A comparator COMP detects the low output from the amplifier AMP and indicates the external logic low.

The level discriminator 82' users a clamp Vt as a separate circuit. When the reset line voltage is greater than the reference voltage REF, the amplifier AMP goes high and turns on the clamp Vt. Once turned on, the clamp Vt pulls the reset line to the clamp voltage. The clamp Vt remains on until the disable signal is raised (for example, to de-assert the reset signal).

Although bipolar transistors are shown for the drivers of FIGS. 9 and 10, FET drivers are preferred.

Thus disclosed is a control system that allows multiple chips 16, 18 and 20 of a disk drive 10 to assert and de-assert a reset signal over a reset line 44 without causing damage to the drivers 54, 56, 62, 72 and 74. The control system also allows the power driver chip 18 to quickly de-assert the reset signal, thereby allowing for startup procedures of the chips 16, 18 and 20 to be synchronized. The control system also distinguishes between the power driver chip 18 asserting a reset signal and another chip 16 or 20 asserting the reset signal, thereby avoiding deadly embraces that might prevent the reset signal from being de-asserted. The control system is inexpensive to implement and does not require the use of additional pins.

We claim:

1. A power driver chip for use in a disk drive, the disk drive including a reset line, an integrated circuit having a first reset pin coupled to the reset line and first means coupled to the first reset pin for switchably asserting a reset signal to a first level on the reset line, the power driver chip comprising:

a second pin adapted to be coupled to the reset line;

second means coupled to the second reset pin for switchably asserting the reset signal to a second level on the reset line;

third means coupled to the second reset pin for switchably de-asserting the reset signal to a third level on the reset line; and control means coupled between the reset line and the third means, the control means including means for producing a level discrimination signal representing whether the first means is asserting the reset signal; and arbitration means responsive to the level discrimination signal for inhibiting the third means from de-asserting the reset signal while the first means is asserting the reset signal;

whereby the control means prevents the power driver chip from de-asserting the reset signal while the integrated circuit is asserting the reset signal.

2. The power driver chip of claim 1, wherein the arbitration means causes the second means to assert the reset signal to the second level while the first means is asserting the reset signal.

3. The power driver chip of claim 2, further comprising a timer responsive to an output of the arbitration means, wherein the timer causes the third means to delay for a period before de-asserting the reset signal, whereby the reset line is clamped to the second level during the delay period.

4. The power driver chip of claim 3, wherein the delay period allows for timing variations between the integrated circuit and the power driver chip to settle.

5. The power driver chip of claim 2, wherein the first, second and third means include low impedance drivers.

6. The power driver chip of claim 1, wherein the level discrimination means includes means for detecting the direction of current flowing through the second pin, the direction indicating whether the first means is asserting the reset signal.

7. The power driver chip of claim 1, wherein the level discriminator means includes means for determining whether voltage on the reset line is at the first level.

8. The power driver chip of claim 1, wherein the integrated circuit further includes means for performing a weak pull-up of the reset line to the third level, and wherein the third means performs a fast pull-up to the third level, whereby the third means has control over pulling up the reset line to the third level.

9. The power driver chip of claim 1, further comprising a reset bit for indicating a reset condition of the power driver chip.

10. A power driver chip for a disk drive including a reset line, an integrated circuit having a first reset pin coupled to the reset line and first means coupled to the first reset pin for switchably providing a low impedance source to assert a reset signal on the reset line, the power driver chip comprising:
 a second pin adapted to be coupled to the reset line;
 second means coupled to the second reset pin for switchably providing a low impedance source to assert the reset signal on the reset line;
 third means coupled to the second reset pin for switchably providing a low impedance source to de-assert the reset signal on the reset line; and
 control means coupled between the reset line and the third means, the control means including means for producing a level discrimination signal representing whether the first means is asserting the reset signal; and arbitration means responsive to the level discrimination signal for inhibiting the third means from de-asserting the reset signal while the first means is asserting the reset signal;
 whereby the power driver chip is prevented from de-asserting the reset signal while the integrated circuit is asserting the reset signal.

11. A disk drive comprising:
 a head disk assembly; and
 a printed circuit board assembly including:
  a reset line;
  a microprocessor chip including a first pin connected to the reset line and a first driver coupled to the first pin, the first driver being capable of asserting a reset signal to a first level on the reset line; and
  an integrated circuit including:
   a second pin connected to the reset line;
   a second driver coupled to the second pin, the second driver being capable of asserting the reset signal to a second level on the reset line;
   a third driver coupled to the second pin, the third driver being capable of de-asserting the reset signal to a third level on the reset line;
   the first and third levels having a potential difference sufficient to cause damage to the disk drive;
   first detection means, coupled to the second pin, for detecting the first level on the reset line;
   second detection means for detecting a reset condition of the integrated circuit; and
   arbitration means for commanding the second driver to assert the reset signal to the second level when the second detection means detects the first level on the reset line,
   the arbitration means inhibiting the third driver from de-asserting the reset signal to a third level when the first detection means detects the first level on the reset line, whereby the arbitration means inhibits the third driver from de-asserting the reset signal while the first driver is asserting the reset signal.

12. The disk drive of claim 11, wherein the arbitration means causes the second driver to assert the reset signal to the second level while the first driver is asserting the reset signal.

13. The disk drive of claim 12, wherein the printed circuit board assembly further includes a timer responsive to an output of the arbitration means, wherein the timer causes the third driver to delay for a period before de-asserting the reset signal.

14. The disk drive of claim 13, wherein the printed circuit board assembly further includes at least two power buses, voltages on the buses having different rise times, wherein the microprocessor chip and the integrated circuit chip have different undervoltage thresholds, and wherein the delay period allows the voltages to rise above the undervoltage thresholds of both chips.

15. The disk drive of claim 11, wherein the microprocessor chip further includes a driver for performing a weak pull-up of the reset line to the third level, and wherein the third driver performs a fast pull-up to the third level, whereby the third means has board control over pulling up the reset line to the third level.

16. The disk drive of claim 11, wherein the first, second and third drivers have low impedances.

17. The disk drive of claim 11, wherein the first detection means includes means for detecting the direction of current flowing through the second pin, the direction indicating whether the reset signal is being asserted at the first level.

18. The disk drive of claim 11, wherein the first detection means includes means for determining whether voltage on the reset line is at the first level.

19. The disk drive of claim 11, wherein the integrated circuit further includes a reset bit for indicating a reset condition of the power driver chip.

20. The disk drive of claim 1, wherein the printed circuit board assembly further includes a test point for the reset line.

21. In a disk drive including an integrated circuit chip and a reset line external of the integrated circuit chip, the chip including a reset pin coupled to the reset line and a circuit coupled to the reset pin for switchably asserting a reset signal to a first level on the reset pin, an off-chip method of asserting and de-asserting the reset signal on the reset line comprising the steps of:
 asserting the reset signal to a second level on the reset line when a reset condition is detected external of the integrated circuit chip;
 detecting when the circuit is asserting the reset signal at the first level on the reset line; and
 inhibiting the reset signal from being de-asserted to a third level on the reset line while the reset signal is being asserted to the first level on the reset line;
 whereby the reset signal is prevented from being de-asserted off the chip while the integrated circuit chip is asserting the reset signal.

22. The method of claim 21, further comprising the step of asserting the reset signal to the second level while the reset signal is being asserted to the first level.

23. The method of claim 22, further comprising the step of delaying for a period of time before de-asserting the reset signal.

24. The method of claim 21, wherein the step of detecting includes the step of detecting a direction of current flowing through the reset line.

25. The method of claim 21, wherein the step of detecting includes the step of detecting a level of voltage on the reset line.

* * * * *